(12) United States Patent
Suciu et al.

(10) Patent No.: US 9,719,465 B2
(45) Date of Patent: Aug. 1, 2017

(54) REVERSE CORE ENGINE WITH THRUST REVERSER

(71) Applicant: UNITED TECHNOLOGIES CORPORATION, Hartford, CT (US)

(72) Inventors: Gabriel L Suciu, Glastonbury, CT (US); Jesse M Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 16 days.

(21) Appl. No.: 14/774,896

(22) PCT Filed: Mar. 12, 2014

(86) PCT No.: PCT/US2014/023997
§ 371 (c)(1),
(2) Date: Sep. 11, 2015

(87) PCT Pub. No.: WO2014/193515
PCT Pub. Date: Dec. 4, 2014

(65) Prior Publication Data
US 2016/0017844 A1    Jan. 21, 2016

Related U.S. Application Data (60) Provisional application No. 61/781,897, filed on Mar. 14, 2013.

(51) Int. Cl.
| | | |
|---|---|---|
| *F02K 1/70* | (2006.01) | |
| *F02K 1/60* | (2006.01) | |
| *F02C 3/10* | (2006.01) | |
| *B64D 29/04* | (2006.01) | |
| *B64D 33/04* | (2006.01) | |
| *F02K 3/00* | (2006.01) | |

(52) U.S. Cl.
CPC ............ *F02K 1/70* (2013.01); *B64D 29/04* (2013.01); *B64D 33/04* (2013.01); *F02C 3/10* (2013.01); *F02K 1/60* (2013.01); *F02K 1/605* (2013.01); *F02K 3/00* (2013.01); *F05D 2250/314* (2013.01)

(58) Field of Classification Search
CPC ............ F02K 1/70; B64D 29/04; B64D 33/04
See application file for complete search history.

(56) References Cited

U.S. PATENT DOCUMENTS

| | | |
|---|---|---|
| 3,997,134 A | 12/1976 | Drakeley |
| RE31,591 E | 5/1984 | Drakeley |
| 4,865,256 A | 9/1989 | Durand et al. |
| 6,688,099 B2 | 2/2004 | Lair |
| 7,237,378 B2 | 7/2007 | Lardellier |
| 8,052,085 B2 | 11/2011 | Lair |
| 8,176,725 B2 | 5/2012 | Norris et al. |
| 2005/0060983 A1 | 3/2005 | Lardellier |
| 2007/0095972 A1* | 5/2007 | Buffenoir ................ B64C 15/02 244/15 |
| 2008/0258016 A1* | 10/2008 | Gukeisen ............... B64D 29/00 244/53 R |

(Continued)

*Primary Examiner* — Justin Benedik
(74) *Attorney, Agent, or Firm* — Bachman & LaPointe, P.C.

(57) ABSTRACT

An engine system has a gas generator, a bi-fi wall surrounding at least a portion of the gas generator, a casing surrounding a fan, and the casing having first and second thrust reverser doors which in a deployed position abut each other and the bi-fi wall.

16 Claims, 6 Drawing Sheets

(56) References Cited

U.S. PATENT DOCUMENTS

2009/0126339 A1    5/2009   Lair
2010/0038472 A1    2/2010   Cazals et al.
2010/0180568 A1*   7/2010   Sachs ........................ F02C 5/02
                                                                    60/39.511

* cited by examiner

REVERSE CORE ENGINE WITH THRUST REVERSER

STATEMENT OF GOVERNMENT INTEREST

The Government of the United States of America may have rights in the present invention as a result of NASA Cooperative Agreement Contract No. NNX11AB35A and Sub-Contract No. MIT/PW Subaward No. 5710002937 awarded by NASA.

BACKGROUND

The present disclosure relates to a thrust reverser to be used with a reverse core engine in a double bubble airframe.

In many airplanes, the engines are located under the wing. Upon landing such aircraft, thrust reversers on the engines are used to slow the aircraft. The thrust reversers have many different configurations such as clamshells or bucket configuration.

In certain aircraft configurations, the engines must be situated in other locations on the aircraft. Thus, it becomes necessary to reconfigure engine elements such as the thrust reversers.

SUMMARY

In accordance with the present disclosure, there is provided an engine system comprising: a gas generator; a bi-fi wall surrounding at least a portion of the gas generator; a casing surrounding a fan; and the casing having first and second thrust reverser doors which in a deployed position abut each other and the bi-fi wall.

In another and alternative embodiment, the gas generator has a reverse engine core.

In another and alternative embodiment, the engine system further comprises the casing having an arcuate shape and each of the first and second thrust reverser doors having a curved shape to conform to the arcuate shape of the casing.

In another and alternative embodiment, each of the first and second thrust reverser doors forms a portion of the casing when in a stowed position.

In another and alternative embodiment, each of the first and second thrust reverser doors has an asymmetrically contoured rear edge to minimize leaks between the first and second thrust reverser doors and the bi-fi wall when in the deployed position.

In another and alternative embodiment, the first and second thrust reverser doors in a deployed position abut each other along an inner edge and are spaced from each other along an outer edge so as to abut the bi-fi wall.

In another and alternative embodiment, the engine system further comprises at least one aerodynamic fairing and the at least one aerodynamic fairing housing an intake for supplying air to the gas generator.

In another and alternative embodiment, the intake provides free stream air to the gas generator.

Further in accordance with the present disclosure, there is provided an aircraft broadly comprising a fuselage and a tail section; an engine system comprising at least one casing housing a fan and a free turbine and at least one gas generator for supplying a fluid to drive the free turbine and said fan; a bi-fi wall housing at least a portion of the at least one gas generator; and the casing having first and second thrust reverser doors which in a deployed position abut each other and the bi-fi wall.

In another and alternative embodiment, the at least one casing has an arcuate shape and each of the first and second thrust reverser doors has a curved shape to conform to the arcuate shape of the casing.

In another and alternative embodiment, each of the first and second thrust reverser doors forms a portion of the at least one casing when in a stowed position.

In another and alternative embodiment, each of the first and second thrust reverser doors has an asymmetrically contoured rear edge to minimize leaks between the first and second thrust reverser doors and the bi-fi wall when in the deployed position.

In another and alternative embodiment, the first and second thrust reverser doors in a deployed position abut each other along an inner edge and are spaced from each other along an outer edge so as to abut the bi-fi wall.

In another and alternative embodiment, the aircraft further comprises at least one aerodynamic fairing located at the tail section.

In another and alternative embodiment, the aircraft further comprises the at least one aerodynamic fairing housing an intake for supplying air to the at least one gas generator.

In another and alternative embodiment, the intake provides free stream air to the at least one gas generator.

In another and alternative embodiment, the aircraft further comprises the fuselage having at least one inlet channel for supplying air to the fan.

Other details of the reverse core engine with the thrust reverser are set forth in the following detailed description and the accompanying drawings wherein like reference numerals depict like elements.

DETAILED DESCRIPTION

Figure 1:
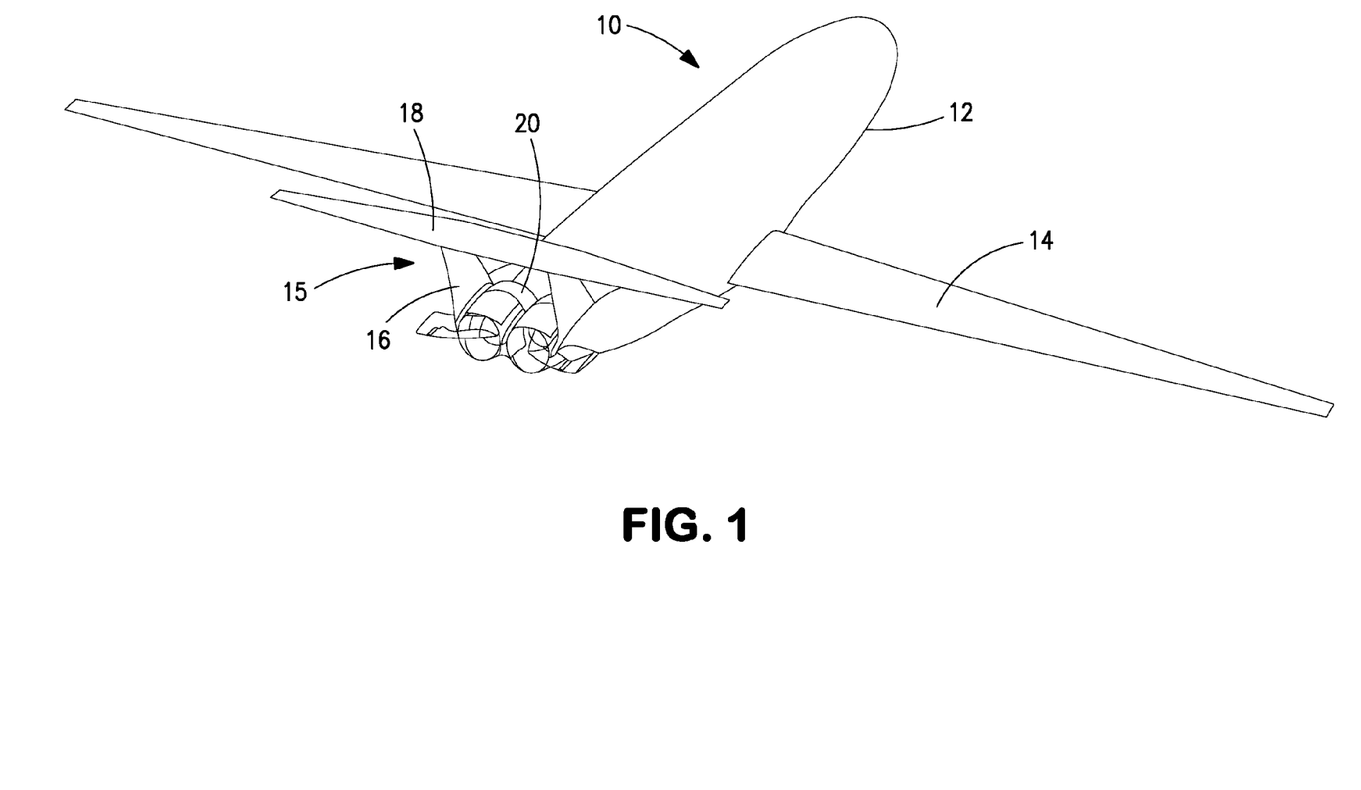
FIG. 1 is a schematic representation of an aircraft.
Figure 2:
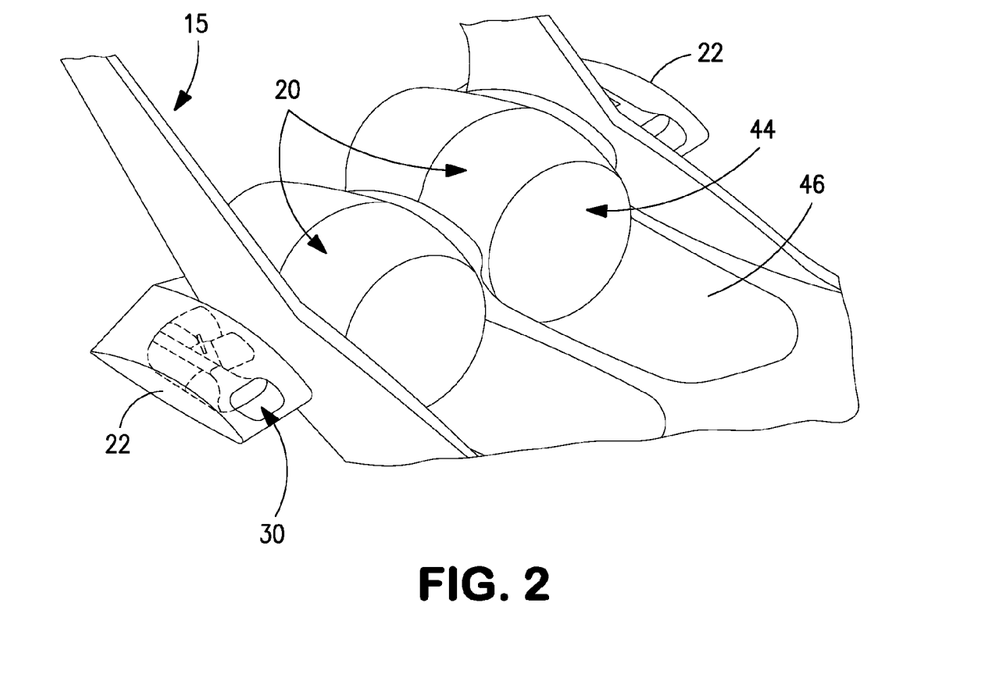
FIG. 2 is a schematic representation of the location of the reverse core engines in the tail of the aircraft.

FIG. 1 illustrates an aircraft 10 having a fuselage 12, wings 14, and a tail 15 having vertical tail surfaces 16 and a tail wing 18 mounted to the tail surfaces 16. As shown in FIG. 2, a pair of propulsors 20, which is a pair of gas turbine engines, is mounted to the fuselage 12 at the base of the tail 15. The inlet 44 to each of the propulsors 20 includes a channel 46 for delivering atmospheric air to the propulsors 20.

Figure 3:
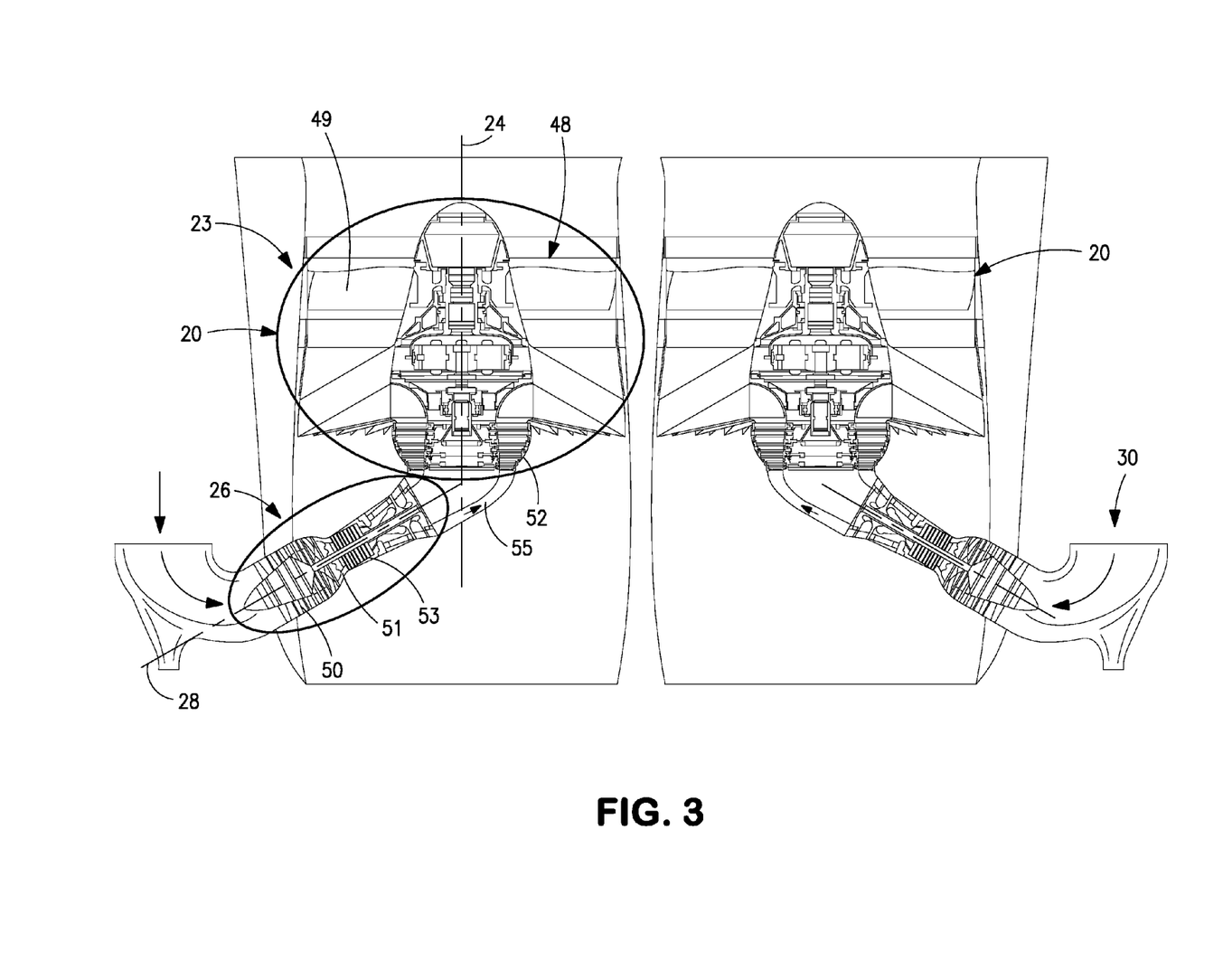
FIG. 3 is a sectional view of a reverse core engines to be used in the aircraft of FIG. 1.

An aerodynamic fairing 22 extend from each side of the fuselage 12 adjacent the tail 15. Each aerodynamic fairing 22 houses an intake 30 for delivering free stream air to a respective gas generator 26 (see FIG. 3) for supplying fluid to drive the propulsor 20. The intake 30 is designed to capture 110% of the flow required by the gas generator 26. As shown in FIG. 3, the intake 30 turns the air approximately 90 degrees to enter the gas generator 26.

Referring now to FIG. 3, each of the propulsor engines 20 includes a propulsor section 23 which has a free turbine 52, a fan 48 having a plurality of fan blades 49 driven by the free turbine 52, and a plurality of fan exit guide vanes 47. The free turbine 52 and the fan 48 rotate about a central axis 24. The gas generator 26 may be a reverse core engine which supplies fluid to drive the free turbine 52 and the fan 48. The gas generator 26 may have a longitudinal axis or central axis 28 which is at an angle to the central axis 24. The gas generator 26 may include a compressor section 50 having one or more stages such as a low pressure compressor stage and a high pressure compressor stage, a combustion section 51 having one or more combustors, and a turbine section 53 having one or more stages such as a low pressure turbine stage and a high pressure turbine stage. The low pressure compressor in the gas generator 26 is driven by a low pressure turbine via a low pressure spool and a high pressure compressor in the gas generator 26 is driven by a high pressure turbine via a high pressure spool. The gas generator 26 delivers combusted fuel fluid to the free turbine 52 via a plenum 55 to drive the free turbine 52. The free turbine 52 drives the fan 48.

Figure 4:
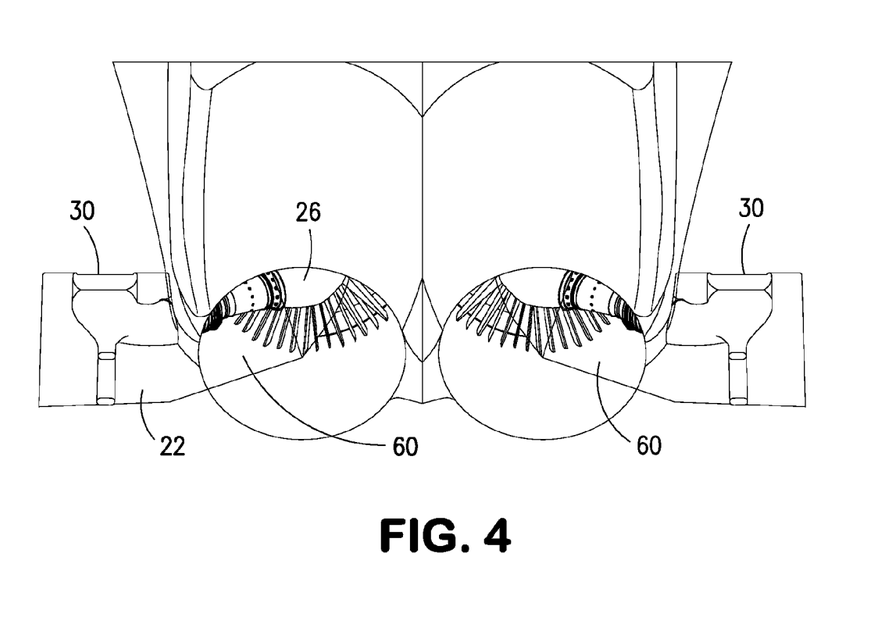
FIG. 4 is a schematic view of the rear portion of the aircraft fuselage of FIG. 1.

As shown in FIG. 4, at least a portion of the gas generator 26 may be housed within a bi-fi wall 60. If desired, all of the gas generator 26 may be housed within the bi-fi wall 60. The aerodynamic fairing 22, containing the intake 30, may be blended into the bi-fi wall 60.

Figure 5A:
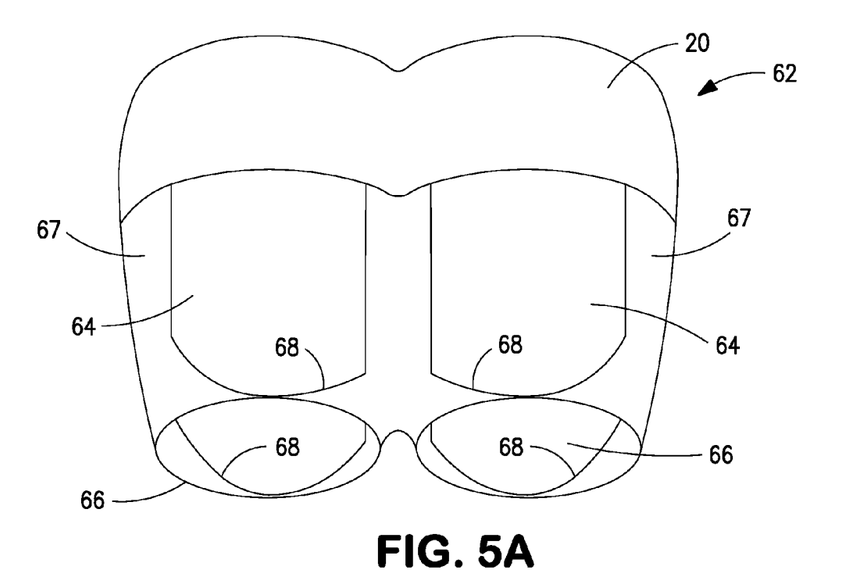
FIG. 5A is a perspective view showing the thrust reverser doors in a stowed position.
Figure 5B:
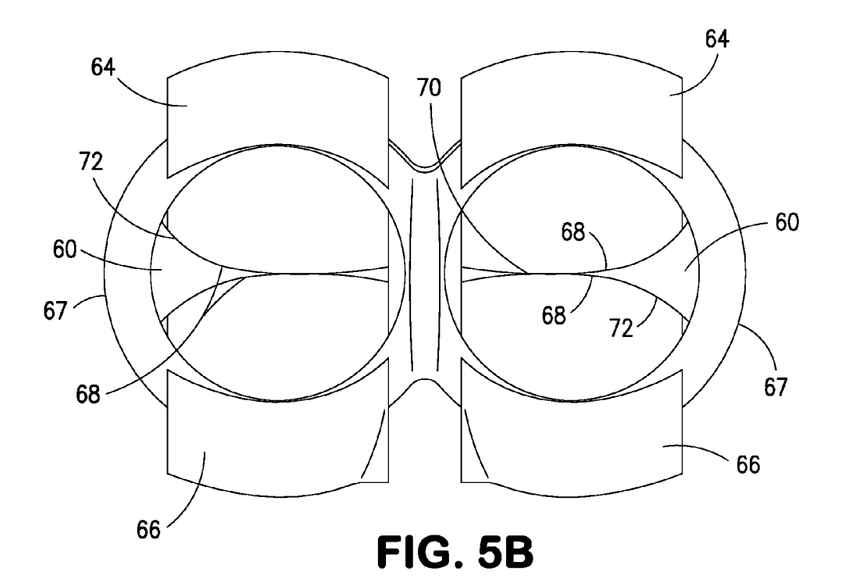
FIG. 5B is a rear view showing the thrust reverser doors in a deployed position.

As shown in FIGS. 5A and 5B, the thrust reverser system 62 for each of the propulsors 20 comprises first and second thrust reverser doors 64 and 66. Each of the first and second thrust reverser doors 64 and 66 has a curved, or arcuate, shape which conforms to the shape of the casing 67 which houses the respective propulsor section 23. In a stowed position, the first and second thrust reverser doors 64 and 66 form a portion of the casing 67. In this configuration, the first thrust reverser door 64 forms part of the top portion of the casing 67 and the second thrust reverser door 66 forms part of the bottom portion of the casing 67.

Each of the first and second thrust reverser doors 64 and 66 has a contoured rear edge 68 which closes against the bi-fi wall 60, which encloses the gas generator 26. The contoured rear edge 68 of each of the first and second thrust reverser doors 64 and 66 is asymmetrically contoured to minimize leakage between the respective thrust reverser door 64 or 66 and the bi-fi wall 60. As can be seen from FIG. 5B, in the deployed position, the rear edges 68 of the first and second thrust reverser doors 64 and 66 abut each other along an inner edge 70 and are spaced from each other along an opposing outer edge 72 to accommodate the bi-fi wall 60.

Figure 6A:
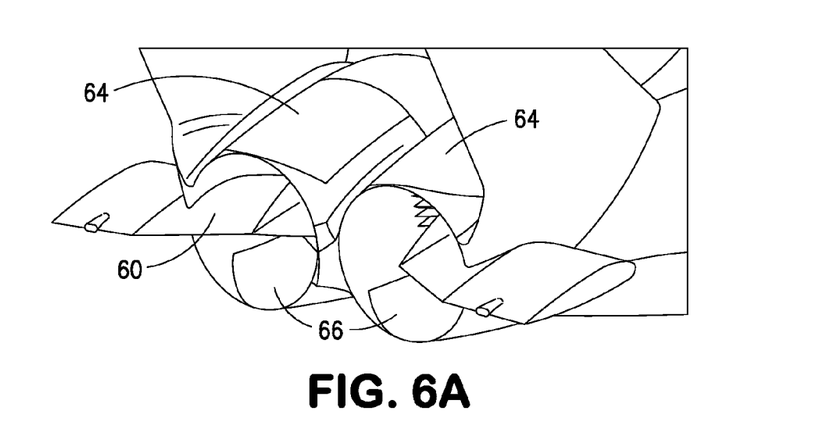
FIGS. 6A-6C show the movement of the thrust reverser doors from a stowed position to a fully deployed position.
Figure 6B:
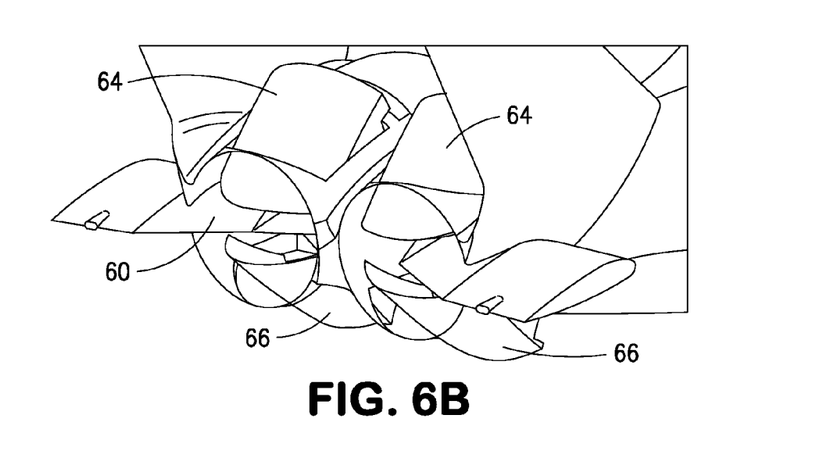
Figure 6C:
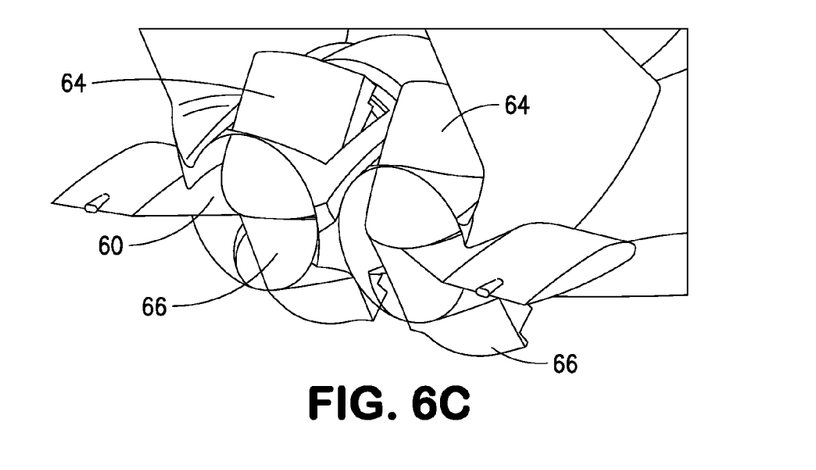
Figure 7A:
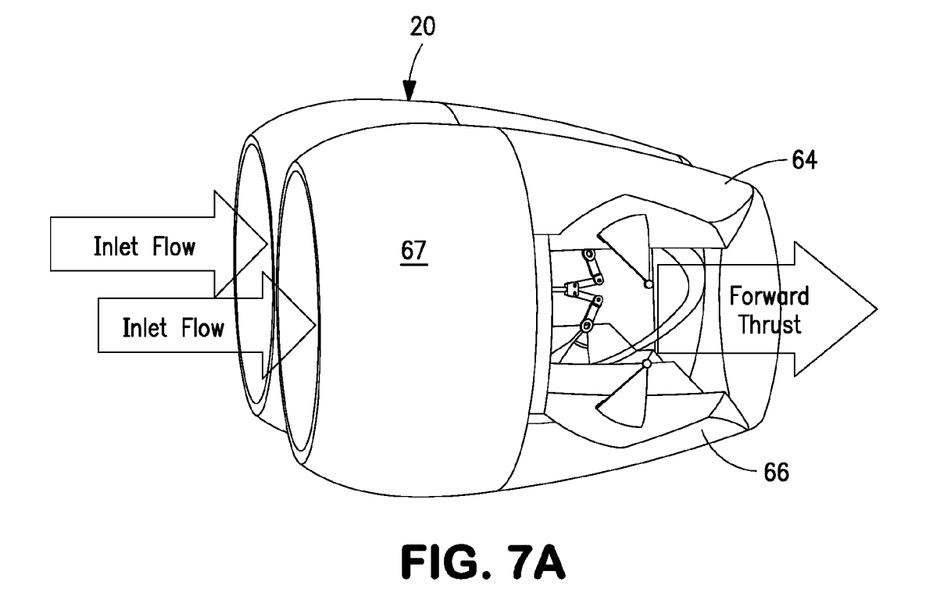
FIG. 7A shows the thrust reverser doors in a stowed position.
Figure 7B:
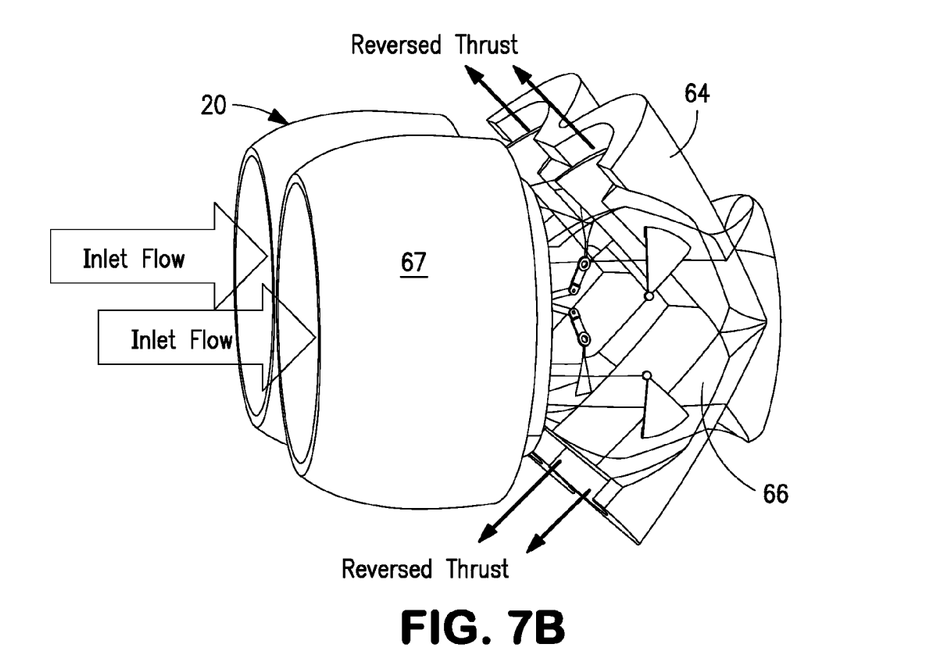
FIG. 7B shows the thrust reverser doors in a deployed position.

Referring now to FIGS. 6A-6C and FIGS. 7A and 7B, the first and second thrust reverser doors 64 and 66 move from a stowed position (FIG. 6A) to a partially deployed position (FIG. 6B) to a fully deployed position (FIG. 6C). As can be seen from FIG. 6C, the asymmetrically contoured rear edges 68 of the doors 64 and 66 in the fully deployed position abut each other and the bi-fi wall 60.

The first and second thrust reverser doors 64 and 66 may be moved between the stowed position and the fully deployed position by an actuator system (not shown).

During operation, the first and second thrust reverser doors 64 and 66 provide a quicker reduction in forward movement of the aircraft 10 by minimizing leakage between the first and second thrust reverser doors 64 and 66 and the bi-fi wall 60.

There has been provided a reverse core engine with a thrust reverser. While the reverse core engine with a thrust reverser has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. An engine system comprising:
a gas generator;
a bi-fi wall surrounding at least a portion of said gas generator;
a casing surrounding a fan; and
said casing having first and second thrust reverser doors which in a deployed position abut each other and said bi-fi wall, wherein each of said first and second thrust reverser doors has an asymmetrically contoured rear edge to minimize leaks between said first and second thrust reverser doors and said bi-fi wall when in said deployed position.

2. The engine system according to claim 1, wherein said gas generator has a reverse engine core.

3. The engine system of claim 1, further comprising said casing having an arcuate shape and each of said first and second thrust reverser doors having a curved shape to conform to said arcuate shape of said casing.

4. The engine system of claim 3, wherein each of said first and second thrust reverser doors forms a portion of said casing when in a stowed position.

5. The engine system of claim 1, wherein said first and second thrust reverser doors in a deployed position abut each other along an inner edge and are spaced from each other along an outer edge so as to abut the bi-fi wall.

6. The engine system of claim 1, further comprising at least one aerodynamic fairing and said aerodynamic fairing housing an intake for supplying air to said gas generator.

7. The engine system of claim 6, wherein said intake is an intake which provides free stream air to said gas generator.

8. An aircraft comprising:
a fuselage and a tail section;
an engine system comprising at least one casing housing a fan and a free turbine and at least one gas generator for supplying a fluid to drive said free turbine and said fan;
a bi-fi wall housing at least a portion of said at least one gas generator; and
said casing having first and second thrust reverser doors which in a deployed position abut each other and said bi-fi wall, wherein each of said first and second thrust reverser doors has an asymmetrically contoured rear edge to minimize leaks between said first and second thrust reverser doors and said bi-fi wall when in said deployed position.

9. The aircraft of claim 8, wherein said at least one casing has an arcuate shape and each of said first and second thrust reverser doors has a curved shape to conform to said arcuate shape of said casing.

10. The aircraft of claim 9, wherein each of said first and second thrust reverser doors forms a portion of said at least one casing when in a stowed position.

11. The aircraft of claim 8, wherein said first and second thrust reverser doors in a deployed position abut each other along an inner edge and are spaced from each other along an outer edge so as to abut the bi-fi wall.

12. The aircraft of claim 8, further comprising at least one aerodynamic fairing located at said tail section.

13. The aircraft of claim 12, further comprising said at least one aerodynamic fairing housing an intake for supplying air to said at least one gas generator.

14. The aircraft of claim 13, wherein said intake is an intake which provides free stream air to said at least one gas generator.

15. The aircraft of claim 8, further comprising said fuselage having at least one inlet channel for supplying free stream air to said fan.

16. An engine system comprising:
   a gas generator;
   a bi-fi wall surrounding at least a portion of said gas generator;
   a casing surrounding a fan; and
   said casing having first and second thrust reverser doors which in a deployed position abut each other and said bi-fi wall.

* * * * *